US011182726B2

(12) United States Patent
Koenig et al.

(10) Patent No.: US 11,182,726 B2
(45) Date of Patent: Nov. 23, 2021

(54) BLOCKCHAIN-BASED SYSTEM FOR ANALYZING AND TRACKING WORK PERFORMANCE

(71) Applicants: Eric Koenig, Huntington, NY (US); Lisa Marks-Canty, Middlesex, NJ (US)

(72) Inventors: Eric Koenig, Huntington, NY (US); Lisa Marks-Canty, Middlesex, NJ (US)

(73) Assignee: NEST GLOBAL SOLUTIONS, LLC, Summit, NJ (US)

( * ) Notice: Subject to any disclaimer, the term of this patent is extended or adjusted under 35 U.S.C. 154(b) by 0 days.

(21) Appl. No.: 16/368,656

(22) Filed: Mar. 28, 2019

(65) Prior Publication Data

US 2020/0311646 A1 Oct. 1, 2020

(51) Int. Cl.
*G06Q 10/06* (2012.01)
*G06F 21/55* (2013.01)
(Continued)

(52) U.S. Cl.
CPC ..... *G06Q 10/06398* (2013.01); *G06F 21/552* (2013.01); *G06K 9/00161* (2013.01);
(Continued)

(58) Field of Classification Search
CPC ............. G06Q 10/06398; G06N 20/00; G06F 21/552; G06F 2221/034; G06K 9/00161;
(Continued)

(56) References Cited

U.S. PATENT DOCUMENTS 9,331,856 B1 * 5/2016 Song ................... G06F 21/64
10,002,277 B1 * 6/2018 Endress ................ G09C 5/00
(Continued)

FOREIGN PATENT DOCUMENTS

JP 6306400 B2 * 4/2018

OTHER PUBLICATIONS

Spring, Tom."WikiLeaks Reveals CIA Tool 'Scribbles' For Document Tracking." Initially published on Apr. 28, 2017, with an update on Apr. 29, 2017 [retrieved on Mar. 29, 2020].Retrieved from the Internet <URL: https://threatpost.com/wikileaks-reveals-cia-tool-scribbles-for-document-tracking/125299/>.*
(Continued)

*Primary Examiner* — Susanna M. Diaz
(74) *Attorney, Agent, or Firm* — Georgiy L. Khayet

(57) ABSTRACT

Disclosed are blockchain-based systems and methods for analyzing and tracking work performance. An example method may commence with detecting a plurality of actions performed by one or more users with regard to one or more digital files. The method may continue with creating a timestamp for each of the plurality of actions. The method may further include generating a hash value for each of the plurality of actions. The method may continue with storing the hash value and the timestamp associated with each of the plurality of actions to a record on a blockchain. The method may further include analyzing the hash value and the timestamp associated with the plurality of actions of the one or more users to evaluate the work performance of the one or more users.

19 Claims, 13 Drawing Sheets

(51) Int. Cl.
  *H04L 9/06* (2006.01)
  *H04L 9/30* (2006.01)
  *G06N 20/00* (2019.01)
  *G06K 9/00* (2006.01)
  *H04N 1/32* (2006.01)
  *G06T 1/00* (2006.01)

(52) U.S. Cl.
  CPC ......... *G06K 9/00469* (2013.01); *G06N 20/00* (2019.01); *G06T 1/0021* (2013.01); *H04L 9/0643* (2013.01); *H04L 9/30* (2013.01); *H04N 1/32149* (2013.01); *G06F 2221/034* (2013.01); *G06K 2209/01* (2013.01); *H04L 2209/38* (2013.01)

(58) Field of Classification Search
  CPC ............. G06K 9/00469; G06T 1/0021; H04L 9/0643; H04L 9/30; H04N 1/32149
  See application file for complete search history.

(56) References Cited

U.S. PATENT DOCUMENTS

| | | | |
|---|---|---|---|
| 2013/0227714 A1* | 8/2013 | Gula | H04L 63/0876 726/32 |
| 2016/0044460 A1* | 2/2016 | Cornaby | H04W 4/023 455/456.3 |
| 2016/0140477 A1* | 5/2016 | Karanam | G06Q 10/063112 705/7.14 |
| 2017/0104893 A1* | 4/2017 | Hardy | G06F 21/629 |
| 2017/0287090 A1* | 10/2017 | Hunn | G06Q 50/18 |
| 2018/0078843 A1* | 3/2018 | Tran | G16H 40/63 |
| 2018/0165779 A1* | 6/2018 | Martin | G06Q 50/20 |
| 2018/0300693 A1* | 10/2018 | Gopinath | G06Q 20/4016 |
| 2018/0330451 A1* | 11/2018 | Volberg | G06Q 10/1091 |
| 2019/0079950 A1* | 3/2019 | Ramabaja | H04L 9/3236 |
| 2020/0059363 A1* | 2/2020 | Lobo | G07G 3/00 |

OTHER PUBLICATIONS

Vording, Jan. "Master Thesis: Vault 7 and the Paradox of Democratic Society." Feb. 2018 [retrieved on Mar. 29, 2020]. Retrieved from the Internet: <URL: https://openaccess.leidenuniv.nl/bitstream/handle/1887/84082/Vording_CSM_2018.pdf? sequence=1>.*
English Translation of KDDI (JP-6306400-B2, published Apr. 4, 2018). (Year: 2018).*

* cited by examiner ial description of embodiments includes references to the accompanying drawings, which form a part of the detailed description. Approaches described in this section are not prior art to the claims and are not admitted to be prior art by inclusion in this section. The drawings show illustrations in accordance with example
BLOCKCHAIN-BASED SYSTEM FOR ANALYZING AND TRACKING WORK PERFORMANCE

TECHNICAL FIELD

This disclosure generally relates to data processing and, more particularly, to a blockchain-based system for analyzing and tracking work performance to perform task management through blockchain and provide a real-time, secure, and verified ledger of work performed by an individual or group of individuals.

BACKGROUND

Conventional work performance tracking systems require employees to track time spent on different tasks. Time tracking typically starts tracking time when an employee logs into a company software system and stop tracking time when the employee logs out. However, this approach may be inefficient in monitoring work performance because it is hard to determine whether employees spends their time productively while logged in.

Some types of activity trackers can detect movements of a mouse and a cursor on a screen but cannot tell whether an employee spends time on task or on an unrelated activity. Other types of activity trackers can make screenshots while an employee is working and store the screenshots to a database. However, this approach requires a human to manually review the screenshots and determine whether the employee spent time productively.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to a blockchain-based system and method for analyzing and tracking work performance. An example system may include an activity tracking module configured to detect a plurality of actions performed by one or more users with regard to one or more digital files and create a timestamp for each of the plurality of actions. The system may further include a processor configured to generate a hash value for each of the plurality of actions and store the hash value and the timestamp associated with each of the plurality of actions to a record on a blockchain. The system may further include an analyzing module configured to analyze the hash value and the timestamp associated with each of the plurality of actions of the one or more users to evaluate the work performance of the one or more users. The system may further include the blockchain configured to store a plurality of records.

An example blockchain-based method for analyzing and tracking work performance may commence with detecting a plurality of actions performed by one or more users with regard to one or more digital files. The method may continue with creating a timestamp for each of the plurality of actions. The method may further include generating a hash value for each of the plurality of actions. The method may continue with storing the hash value and the timestamp associated with each of the plurality of actions to a record on a blockchain. The method may further include analyzing the hash value and the timestamp associated with the plurality of actions of the one or more users to evaluate the work performance of the one or more users.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
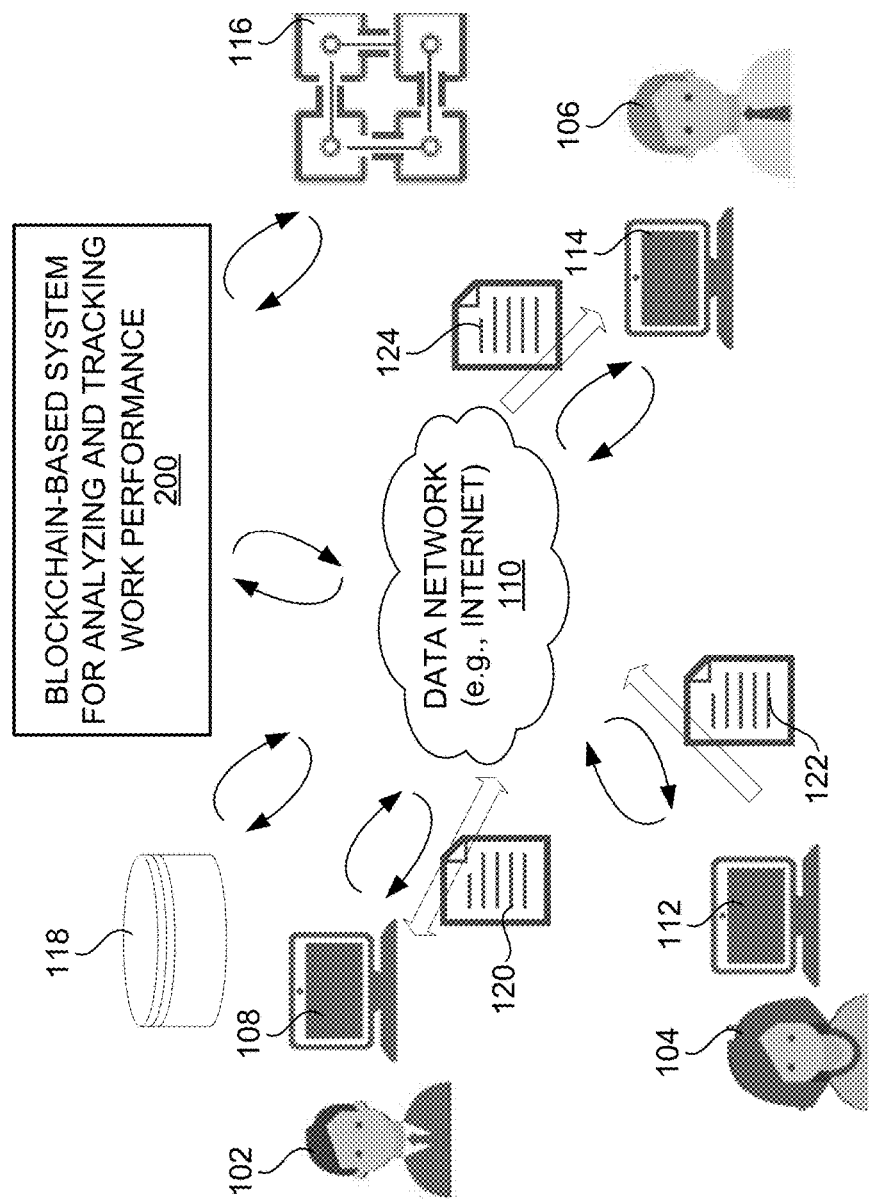
FIG. 1 illustrates an environment within which blockchain-based system and methods for analyzing and tracking work performance can be implemented, in accordance with some embodiments.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to a blockchain-based system for analyzing and tracking work performance. The system provides a real-time, secure, and verified ledger of work performed by an individual or group of individuals. To verify the work performed by the individual, the system tracks actions performed by the individual in a working environment, for example, in an enterprise network environment. The actions tracked by the system include opening or closing files, editing files, printing documents, downloading or uploading files, any revisions to a file made by any party in the chain of document custody, and so forth. For each of the detected actions, the system creates a timestamp and generates a hash value using a blockchain. The blockchain is a shared and distributed list of records, also referred to as blocks, which can be linked together using cryptography. Each record contains a hash of the previous record, a timestamp, and transaction data. The hash is also referred herein to as a cryptographic hash, a hash value, and a hash key.

The system stores the timestamp and the hash value into a record on the blockchain. As the records on the blockchain cannot be changed without changing of all subsequent records and are transparent for all participants of the blockchain, recorded data on actions and type and time of actions performed by the individual cannot be altered, added to, or removed from the blockchain. The system may analyze the hash value and the timestamp associated with actions of the individual to evaluate the work performance of the individual.

The system may be used to ensure accurate billing for work performed by employees and serve as a means of tracking work performance by an employee or a team of employees. For example, as each action of the employee is recorded on the blockchain, there is a ledger of the times when these actions occurred. This ledger can be used to gauge time spent by the employee on a certain document.

Furthermore, as a new hash is generated for every edit made by a user, changes to the document can be tracked to verify edits and determine that the user was not making merely repetitive changes for the time billed, but was actually revising the document, which can be verified with different hashes.

In an example embodiment, the system may be used by a first user, e.g., an attorney, to authenticate a second user, e.g., a client, through use of a private key on the blockchain. The client may be able to view a secured document only after being verified.

In another example embodiment, the system may be used to track employee performance, compare members of a team against each other, determine users who are underperforming, flagging the underperforming users, and presenting recommendations for the underperforming users to help them improve their performance. The recommendations may include, for example, tutorials or online seminars.

Referring now to the drawings, FIG. 1 illustrates an environment 100 within which a blockchain-based system for analyzing and tracking work performance and a blockchain-based method for analyzing and tracking work performance can be implemented, in accordance with some embodiments. The environment 100 may include a plurality of users shown as a user 102, a user 104, and a user 106, user devices 108, 112, and 114, each associated with one of the user 102, the user 104, or the user 106, a blockchain-based system 200 for analyzing and tracking work performance (also referred to as a system 200), a blockchain 116, a database 118, and a data network 110 (e.g., the Internet or a computing cloud). The user devices 108, 112, 114 and the system 200 can be connected via the data network 110. The user devices 108, 112, 114 can include a personal computer (PC), a laptop, a smartphone, a tablet PC, a television set, a smartphone, an Internet phone, a netbook, a network appliance, and so forth.

The data network 110 may include a computing cloud, the Internet, or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34b is analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Each of users 102, 104, and 106 may work with documents stored in the database 118. For example, the user 102 may edit a document 108 stored in the database 118 of the system 200, the user 104 may upload the document 122 from the database 118 of the system 200, and the user 106 may download a document 124 from the database 118 of the system 200. The system 200 may track actions performed by the users 102, 104, and 106 with regard to documents or files stored in the database 118 and store hash values and timestamps for each of the actions as records on the blockchain 116.

Figure 2:
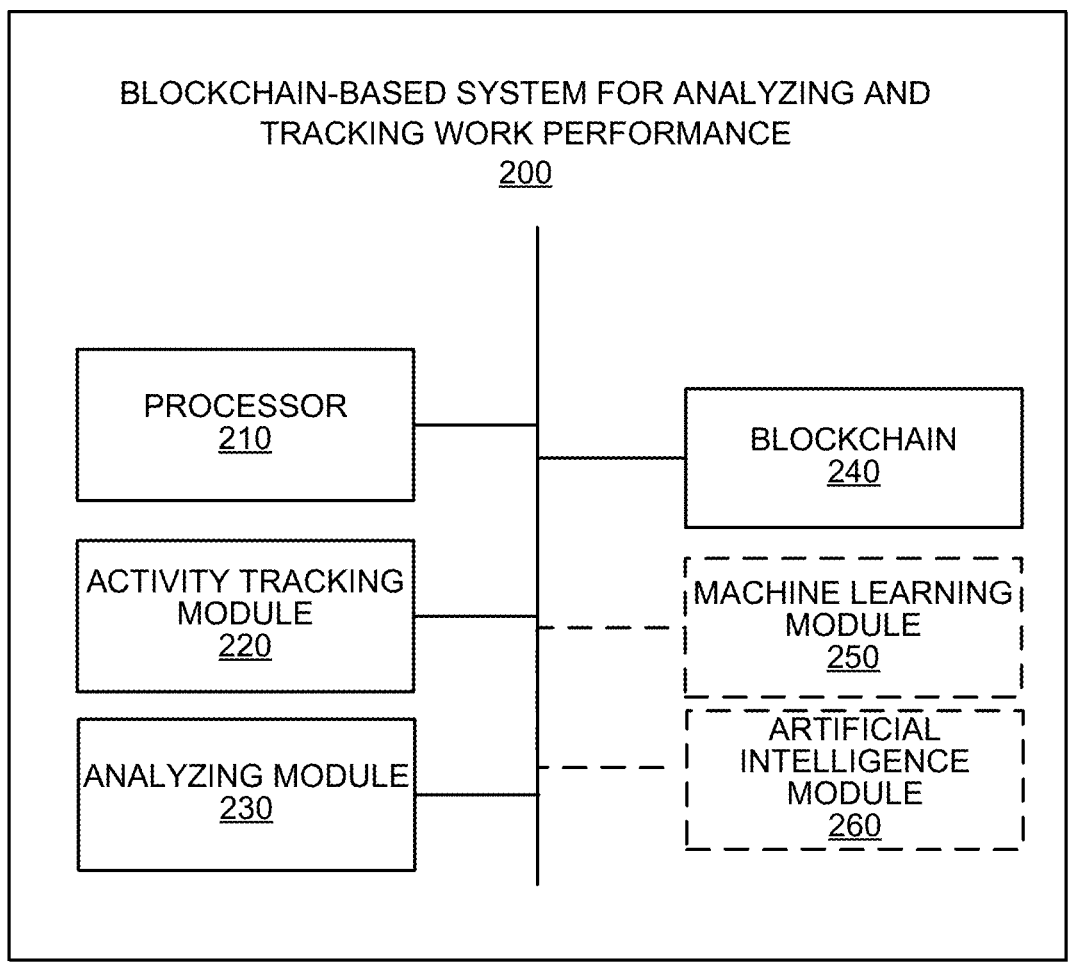
FIG. 2 is a block diagram showing various modules of a blockchain-based system for analyzing and tracking work performance, in accordance with certain embodiments.

FIG. 2 is a block diagram showing various modules of a blockchain-based system 200 for analyzing and tracking work performance in accordance with certain embodiments. The system 200 may include a processor 210, an activity tracking module 220, an analyzing module 230, a blockchain 240, and optionally a machine learning module 250 and an artificial intelligence (AI) module 260. In an example embodiment, any of the processor 210, the activity tracking module 220, the analyzing module 230, the blockchain 240, the machine learning module 250, and the AI module 260 may include a programmable processor, such as a microcontroller, a central processing unit (CPU), or an application-specific integrated circuit or programmable logic array, such as a field programmable gate array, designed to implement the functions performed by the system 200.

The operations performed by the elements of the system 200 are described below with reference to FIG. 3.

Figure 3:
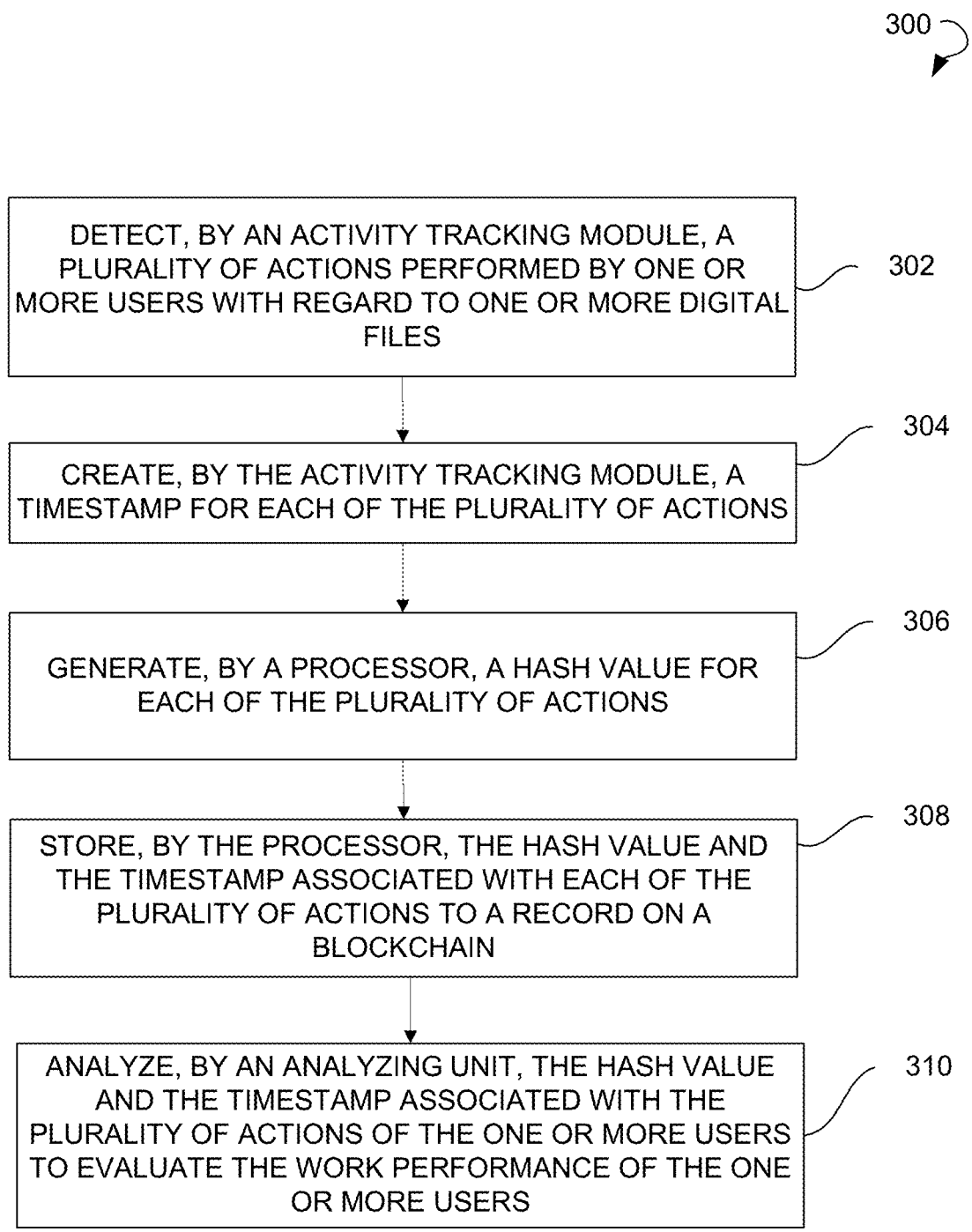
FIG. 3 is a flow chart illustrating a blockchain-based method for analyzing and tracking work performance, in accordance with an example embodiment.

FIG. 3 is a flow chart illustrating a blockchain-based method 300 for analyzing and tracking work performance, in accordance with an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with detecting, by an activity tracking module, at operation 302, a plurality of actions performed by one or more users with regard to one or more digital files. In an example embodiment, the plurality of actions may include one or more of the following: opening a digital file, closing a digital file, editing a digital file, printing a digital file, downloading a digital file, uploading a digital file, sending a digital file, receiving a digital file, converting a digital file, copying a digital file, and so forth.

The method 300 may continue with creating, by the activity tracking module, a timestamp for each of the plurality of actions at operation 304. The method 300 may further include generating, by a processor, a hash value for each of the plurality of actions at operation 306. The method 300 may further include operation 308, at which the processor may store the hash value and the timestamp associated with each of the plurality of actions to a record on a blockchain. The blockchain may be configured to store a plurality of records.

The method 300 may further include analyzing, by an analyzing module, the hash value and the timestamp associated with the plurality of actions of the one or more users at operation 310. Based on the analysis, the work performance of the one or more users may be evaluated. In an example embodiment, the evaluation of the work performance may include determining work time spent by the one or more users. The work time may be determined based on the timestamp stored on the blockchain for each of the plurality of actions performed by the one or more users.

The activity tracking may be utilized to provide active and accurate billing. Specifically, the actions recorded on the blockchain may be analyzed to determine the actual work performed. As each action is hashed to the blockchain, each action is timestamped so the start time and end time are verifiable. This prevents exaggerated billing by the company to protect the client, but may also allow the company to operate transparently, so there is no disputing the work performed and the associated timeframes. Likewise, all activity can be tracked, such that each action can lead to a total billing calculation that factors in the work performed as it is rendered by the company in real time.

The method 300 may continue with analyzing, by the analyzing module, hash values and timestamps associated with the one or more digital files to detect changes between an original version of the one or more digital files and an altered version of the one or more digital files.

The method 300 may further include classifying one or more of the plurality of actions performed by users as a malicious activity. The actions may be classified as the malicious activity based on the analysis of the hash value and the timestamp and, optionally, the analysis of historical data, external data, user activity, browsing history, and so forth to identify certain patterns which might trigger a warning of malicious activity. In an example embodiment, the actions classified as the malicious activity may include, for example, frequent edits or uploading/downloading constantly without making any edits. Upon detecting the malicious activity, the processor may report the malicious activity to a designated person, e.g., a network administrator.

The system 200 shown on FIG. 2 may be integrated with artificial intelligence, adaptive logic, machine learning, and any other technology to enable the system 200 to learn and adapt as the system 200 is utilized and to eventually provide proactive recommendations to users about next steps, best techniques to apply, or required documents.

In an example embodiment, the method 300 may further include collecting, by a machine learning module, historical data related to the work performance of the one or more users. The machine learning module may provide recommendations to at least one of the one or more users to improve the work performance of the at least one of the one or more users. The recommendations may be provided based on machine learning and AI trained on historical data sets.

In an example embodiment, the machine learning module may be further configured to access external data provided by third parties. The machine learning module may analyze the external data and the historical data. The recommendations for the at least one of the one or more users may be selected based on the analysis of the external data and the historical data. Therefore, accessing external data, for example, taking current events or third-party information, and utilizing the external data in concert with the information available from the environment of the system 200 can provide an additional layer of functionality and create a richer, more robust user experience as the feedback the user receives contains more relevant and pertinent information.

In a further example embodiment, the machine learning module may be further configured to detect a user with a work performance score below a predetermined threshold. The detection may be performed based on the analysis of the historical data associated with the one or more users and/or the external data. To make the performance of the company more efficient, workers with low work performance scores may be additionally trained or reassigned tasks for which they receive better performance scores.

The method 300 may further include setting permissions for each of the one or more users. The permissions may include one or more actions permitted to be performed by the one or more users on the one or more digital files.

The method 300 may be used to prevent screen capture, screen grabs, screen shots, and so forth. Specifically, based on the permissions, the analyzing module may determine that a user is not permitted to capture a screenshot of the one or more digital files. Specifically, when the user is not permitted to capture the screenshot, the one or more digital files may be presented for viewing by the user only in response to a prolonged press of a predetermined button by the user. The prolonged press of the predetermined button may deter capturing the screenshot of the one or more digital files. This stops the screen capture as the user is unable to perform another function until the current action is completed. For example, if the user has a right to view a document, but does not have the right to download the document, the user may be required to perform an action to be able to view the document (for example, hold down the left mouse button on a desktop computer or touch the screen of a mobile device—if the user releases the mouse button or lifts the finger from the screen on the user device, the document will close). In other embodiments, the method 300 may include disabling the use of screen capture tools, including those with built-in timers to capture an open document while the required action is being performed.

Further levels of encryption and security of information exchanged via the blockchain may be provided by using optical character recognition (OCR) and beacons described in more detail below.

Beacons are self-contained transmitters that repeatedly send a signal that can be received by nearby devices, such as a Bluetooth-equipped smartphone. In an example embodiment, a digital watermark can be embedded into the one or more digital files. The digital watermark may include a beacon tag. The beacon tag may be tracked to detect actions requested by the one or more users to be performed on the one or more digital files.

Users may be able to affix handwritten signatures to documents when printing the documents, via beacon technology, which provides a sort of geo-aware functionality. For this purpose, a code can be used with AI functionality to embed a signal into a physical document in a paper-based form, i.e. a printout. With the beacon technology, the system 200 may detect the paper document and then, via a positioning system, trigger the actions of the physical document, thereby positioning and creating a unique identifier for the paper-based document.

The system 200 may embed a web beacon-style tag into watermarks located on a documents (e.g., Microsoft Word documents) that can report document analytics back to a centralized monitoring set-up which is secured and permissioned to an author of the document. A web beacon (or web bug) is a transparent graphic image that can be used to report back and create a digital footprint onto the blockchain if a document has been opened and report the Internet Protocol (IP) address of the computer that requested the image file. Other items that can be tracked include one or more of the following: an identity of the document leak, an owner of the document that was opened, a location where the document was opened, date and time when the document was opened, and so forth. In other example embodiments, RFID and vinyl technologies can be utilized for tracking purposes.

In a further example embodiment, a physical document may be printed using quantum dot nanoparticle technology (i.e. nano-sized crystals made of semiconductor materials having predetermined anti-counterfeiting electronic properties to ensure document authenticity and providing a built-in molecular encryption tool), such as quantum ink, which enables users to detect an actual document that was printed. The quantum material may be added to printing ink. The quantum material may have predetermined electronic properties, e.g., may emit a predetermined wavelength. The quantum material can be applied in digital printing technologies using the graphene quantum dots (GQD) to enable items to be hashed on the blockchain. After the document is printed, a wavelength emitted by the quantum material on the physical document may be detected. Upon detecting the wavelength, a hash value associated with the wavelength can be generated. The hash value associated with the wavelength can be then stored to the blockchain. When further physical documents are printed using the quantum material, the event of printing of the physical documents can be detected. Specifically, a further wavelength emitted by the quantum material of the further physical documents may be detected and matched to the hash value associated with the wavelength stored on the blockchain. Upon a successful match, the fact of printing of the physical documents can be detected.

Figure 4:
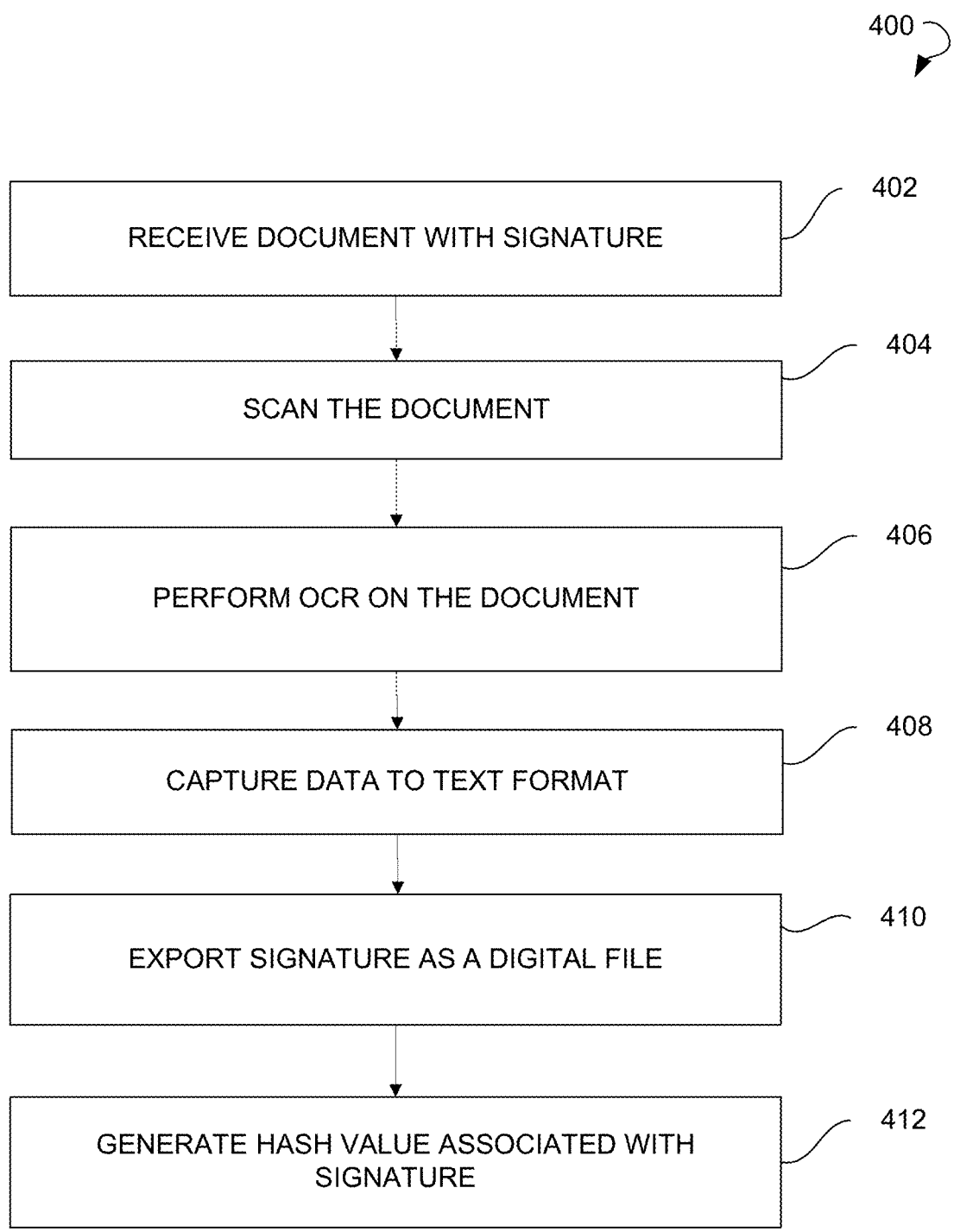
FIG. 4 is a flow diagram showing a method for validating a signature in documents, according to an example embodiment.

FIG. 4 is a flow diagram showing a method 400 for validating a signature contained in documents using the OCR functionality and the blockchain. The method 400 may commence at operation 402 with receiving a document. The document may include a printed physical document or an electronic document, e.g., in Portable Document Format (PDF). The document may contain a signature, i.e. a signature of a person who signed the document. The document may be scanned at operation 404. The OCR of the document may be performed at operation 406 to extract text from the document. The OCR is the identification of printed characters using photoelectric devices and computer software. Thereafter, data may be converted to text format at operation 408. In an example embodiment, the determination that the document contains a signature can be made upon performing OCR of the document. The signature may be exported as a digital file at operation 410. A hash value associated with the signature may be generated at operation 412. The hash value and signature may be stored to the blockchain. The hash value associated with the signature may be used for validating the signature contained in further documents.

Thus, the OCR is used for recognizing the signature in the document as a hash value stored on the blockchain. By verifying the signature on the blockchain and carrying the signature through the chain of custody, the system 200 is able to recognize the original document. This process creates a digital footprint of a handwritten signature. Therefore, when the document is printed by another person, the system 200 has the ability to recognize that the document is the same document as the one that was originally uploaded.

The system 200 shown in FIG. 2 and the method 300 shown in FIG. 3 can be used for providing trustless files sharing between parties. Specifically, the trustless file sharing is achieved using asymmetric key encryption, where a sender of a document encrypts the document using a public key of a recipient and the recipient decrypts the document using a private key of the recipient. In asymmetric key encryption, a private key must remain confidential to its respective owner, and a public key is made available to all via a publicly accessible repository or directory. The public key and private key pair are mathematically related. Whatever is encrypted with a public key may only be decrypted by its corresponding private key and vice versa.

The method 300 shown in FIG. 3 may further include exchanging assets between parties. Specifically, a request to transfer at least one asset to a second user may be received from a first user and, in response, the processor may create a smart contract on the blockchain. The smart contract may be associated with the first user and the second user. Then, the processor may further create an escrow account associated with the smart contract. The escrow account may be stored on the blockchain. The processor may then receive, from the first user, at least one asset to be stored in the escrow account. The processor may transmit the smart contract and the at least one asset to the second user and record the transmission of the smart contract and the at least one asset to the second user as a transaction on the blockchain.

In an example embodiment, the method 300 may further include creating a private key for the first user and providing the private key and a public key to the first user. The first user may encrypt the at least one asset using the public key to upload the at least one asset to the escrow account. The method 300 may further include creating a private key for the second user and providing the private key and the public key to the second user. The second user may decrypt the at least one asset using the private key to download the at least one asset from the escrow account.

Figure 5:
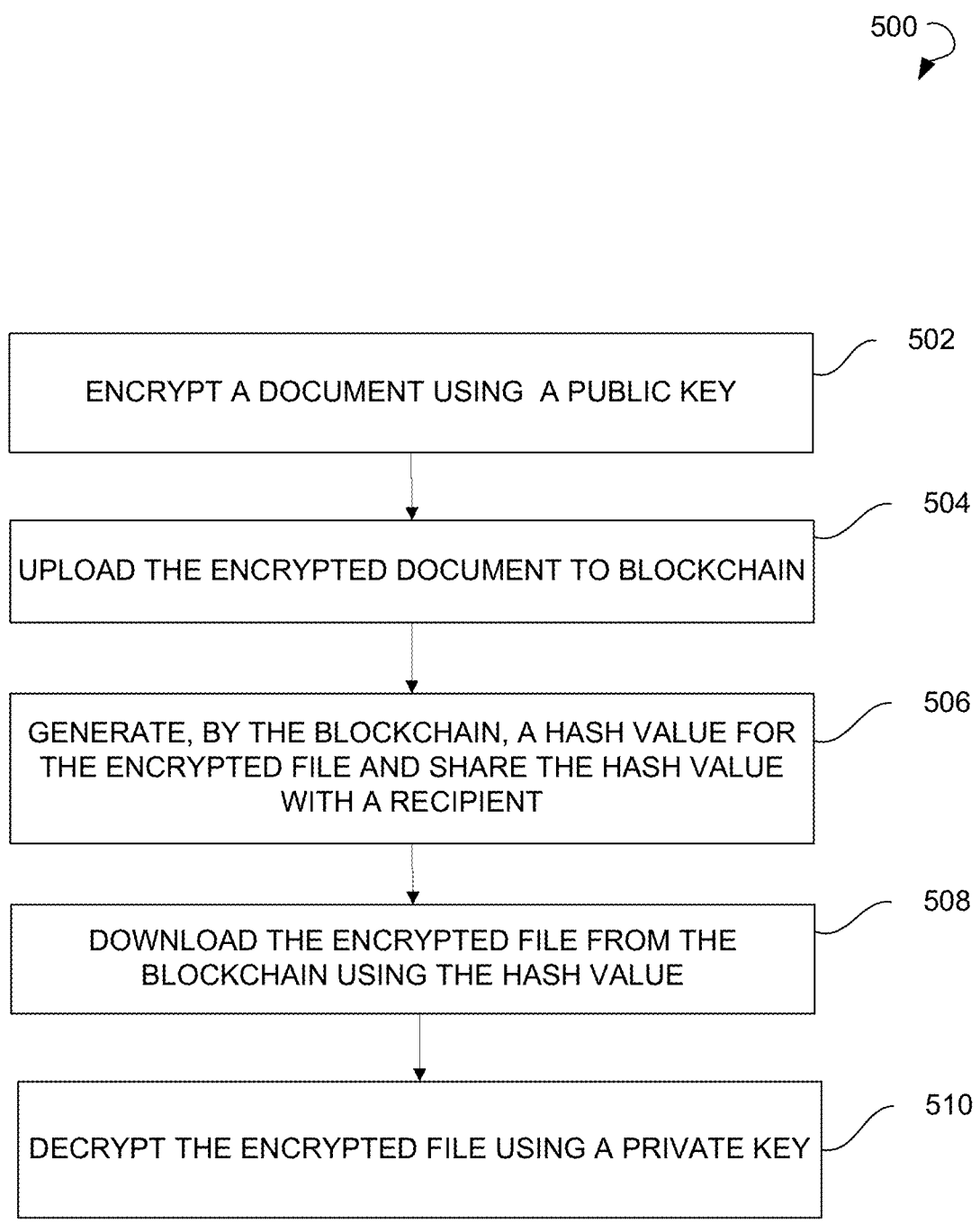
FIG. 5 is a flow diagram showing a method for trustless file sharing between parties, according to an example embodiment.

FIG. 5 is a flow diagram showing a method 500 for trustless file sharing between parties, according to an example embodiment. The parties may include a sender and a recipient. In an example embodiment, the system 200 may be utilized by a first party, e.g., a legal firm or an attorney. The first party may use the system 200 for trustless files sharing between a second party, i.e. a sender, such as an owner of a digital asset, and a third party, i.e., a recipient, such as a person or entity willing to buy or obtain a license for the digital asset.

The method 500 may commence with encrypting, by the sender, a document using a public key at operation 502. The method 500 may continue with uploading the encrypted document to a block of the blockchain at operation 504. The method 500 may further include operation 506, where the blockchain can generate a hash value for the encrypted file and share the hash value with the recipient. At operation 508, the recipient may download the encrypted document from the blockchain using the hash value. The method 500 may further include operation 510, where the recipient may decrypt the encrypted document using a private key of the recipient, which is mathematically related to the public key used by the sender for encryption.

Figure 6:
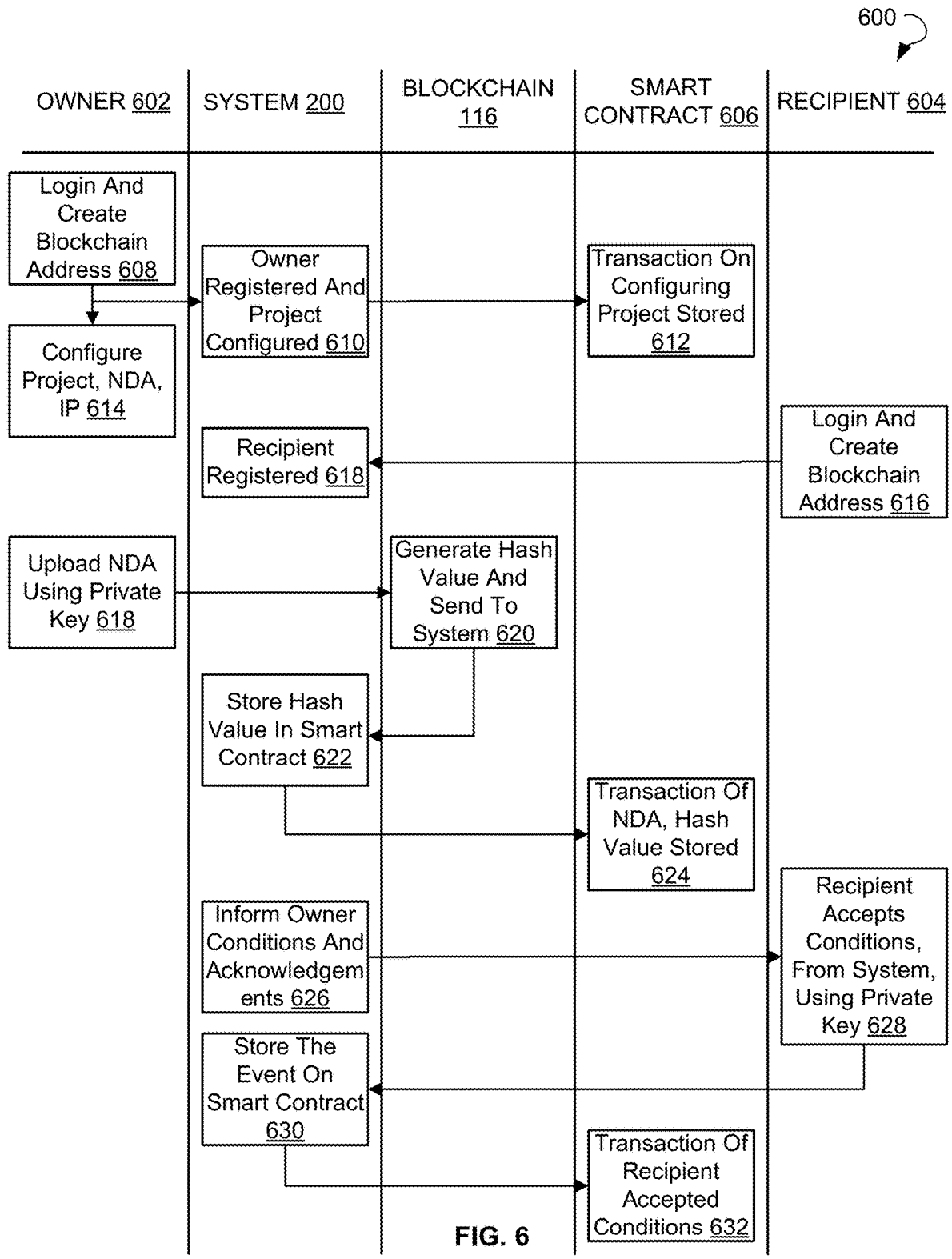
FIGS. 6 and 7 are block diagrams illustrating a method for implementing a chain of custody of a digital asset, according to an example embodiment.
Figure 7:
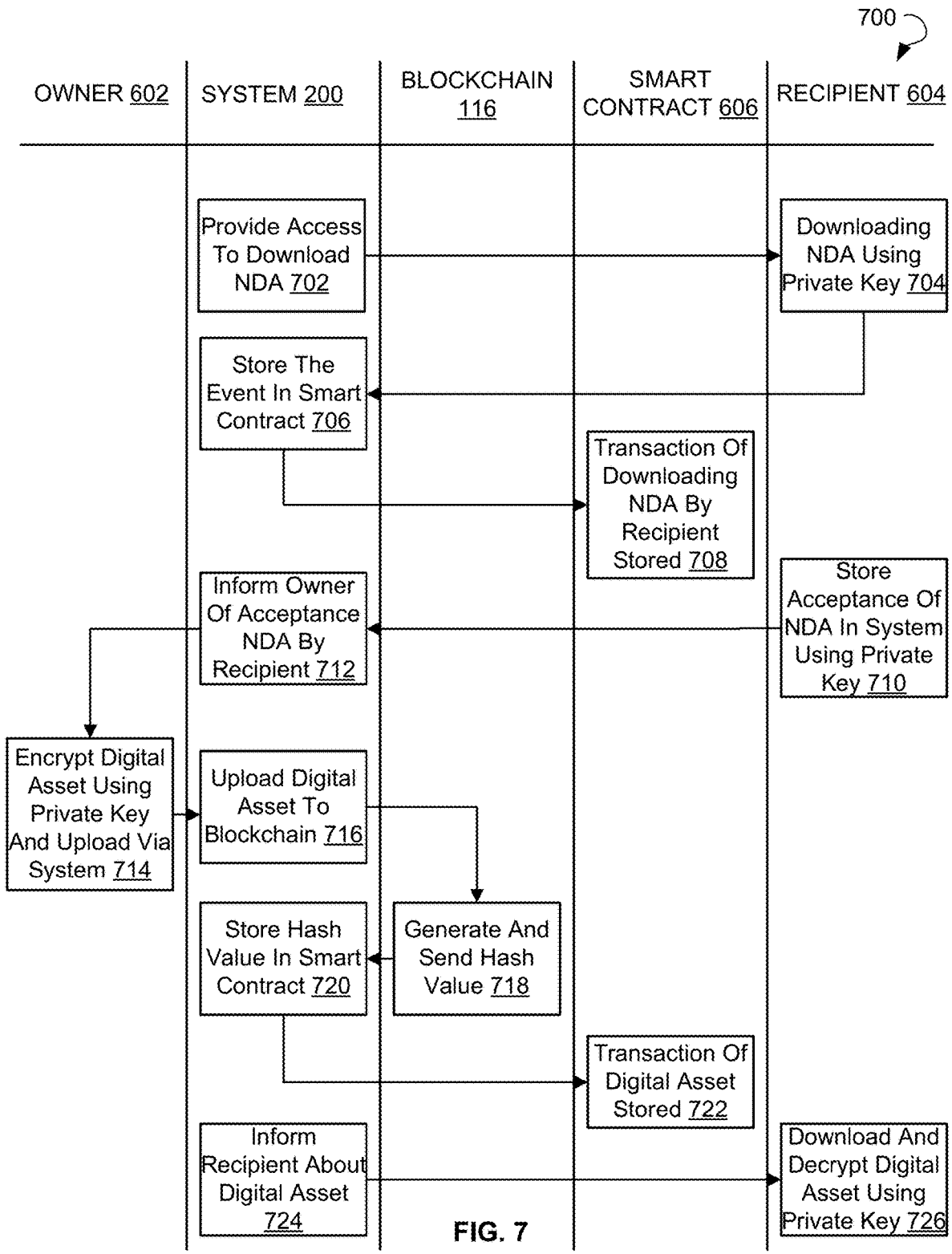

FIGS. 6 and 7 show various operations of a method 600 for implementing a chain of custody of a digital asset, according to an example embodiment. The method 600 can be used to implement a secure document transfer by an automated secured trustless system built on blockchain technology for users (for example, attorneys) to manage the escrow process, transfer and storage of related documents, and storage of transaction records. The attorney can belong to a group of lawyers who provide services to clients regarding legal issues and deals with proper legal documentation of the clients. The client may include any user of the system 200 who consults the attorney for advice concerning business transactions, claim liability, advisability of prosecuting or defending lawsuits, and legal rights and obligations with proper legal documentation.

The method 600 implements a document-centric approach in a firm that securely maintains and shares files on the InterPlanetary File System (IPFS). The IPFS is a peer-to-peer distributed file system that functions to upload the matter-related documents to an IPFS cloud, with the help of immutable and unhackable distributed blockchain. The IPFS is a versioned file system which can store files and track versions over time and define how files move across a network, making it a distributed file system.

Conventionally, file transfers between an attorney and a client used to occur over email, fax, or simple file transfer using File Transfer Protocol (FTP) servers. The method 600 may be utilized by the first party to exchange documents with the clients related to their specific matters and for the escrow process. The method 600 establishes a trustless environment between the attorney and the client, with each transaction recorded on blockchain for proof of the transaction. Furthermore, the method 600 can provide encryption of documents with asymmetric key cryptography and to facilitate storing of the documents in a decentralized cloud storage, i.e., the blockchain.

A person or an entity can decide to license or sell a digital asset to a third-party user for the purpose of enabling the third party user (or another person or entity as its designee) to use the digital asset. In an example embodiment, the digital asset may include intellectual property. The person or entity can create a smart contract using a blockchain-based system for analyzing and tracking work performance (for example, Ethereum or Hyperledger). The person or entity can place their digital asset in a digital form into an escrow account which stores the applicable files, e.g., specification, design, drawings, or other rendering of the digital asset. The escrow account can be linked digitally to the smart contract using a software-based interface of the blockchain-based system 200. The smart contract together with the digital asset is encrypted and transmitted to the third party user for execution and is then recorded on the blockchain.

The method 600 is described in detail with reference to FIGS. 6 and 7. The method 600 may commence with a prerequisite phase of registering users (e.g., attorneys and clients), creating a matter, and associating the matter with the attorney and the client. Specifically, the first client is shown as an owner 602 of a digital asset and the second client is shown as a recipient 604 of the digital asset. FIGS. 6 and 7 also show the system 200 for analyzing and tracking work performance, the blockchain 116, and a smart contract 606. The smart contract 606 is a contract associated with the blockchain 116 designed to set and verify permissions for uploading, editing, and viewing documents, as well as for securely and permanently storing transactions on the blockchain. The attorney can register with the system 200, log in, create a wallet address, a public key, and a private key. Upon registration, the attorney can add a new client to the system 200, e.g., the owner 602.

The method 600 can commence at operation 608 with the owner 602 logging into the system 200 and creating a blockchain address, also referred to as a wallet address. Furthermore, a public key and a private key can be created for the owner 602. The attorney can create a new matter, or a project, and associate himself/herself with a client related to a matter. The matter can include any related activity between the attorney and the client involving activities for managing all aspects of interactions between the attorney and the client. At step 610, the system can register the owner 602 and configure the project. At step 612, a transaction of configuring the project can be stored in the smart contract 606. At step 614, the owner 602 can configure the project, prepare a non-disclosure agreement (NDA), and a digital asset for further sharing using the system 200.

At step 616, the recipient 604 can log into the system 200, create a blockchain address, a public key, and a private key. At step 618, the system 200 can register the recipient.

The method 600 may also include steps related to exchange of non-sensitive documents between the attorney and the owner 602 without encrypting the documents (not shown). Specifically, the attorney may send a request for a document list and set permissions for each document based on the client and the matter. The permissions set by the attorney may be stored in the smart contract 606. The owner 602 may log in and check his/her tasks based on the permissions set by the attorney. If the owner 602 has a task to upload a document, then the owner 602 can enter his private key, browse a document and upload the document. The owner 602 may also attempt to upload the document to the blockchain 116. Then, the system 200 may check the permissions of the owner 602 on the smart contract 606. If the owner 602 has necessary permissions, the owner 602 can upload the document to the blockchain 116. Thereafter, a new blockchain address may be created for this document. The blockchain 116 may return a hash value associated with the document to the system 200. The system 200 may store the hash value on the blockchain 116 as a transaction record.

The method 600 may further include steps related to exchange of sensitive documents between the attorney and the owner 602 using asymmetric encryption (not shown). Specifically, the attorney may select a specific registered client, such as the owner 602. The attorney may review a document, send the document to the selected owner 602, and upload the document to the system 200. The system 200 can encrypt the document with the public key of the owner 602. The system 200 can upload the encrypted document to the blockchain 116. The blockchain 116 can then return a hash value for the encrypted document. The system 200 may allow the owner 602 to download the encrypted document such that the owner 602 can download the document received from the attorney. The owner 602 can use the private key of the owner 602 to decrypt the downloaded document.

The method 600 can continue with implementing an escrow process between the parties. At step 618, the owner may encrypt an NDA using the private key and upload the NDA to the system 200. The blockchain 116 can generate a hash value for the NDA and send the hash value to the system 200 at step 620. The system 200 can the store the hash value in the smart contract 606 at step 622. At step 624, the smart contract 606 can store the NDA and the hash value associated with the NDA as a transaction.

At step 626, the system 200 can provide information concerning conditions and acknowledgements of the owner 602 related to transfer of the digital asset to the recipient 604. At step 628, the recipient 604 can accept the conditions using the private key. At step 630, the system 200 can store the event of accepting the conditions by the recipient 604 to the smart contract 606. At step 632, the event of acceptance of the conditions by the recipient 604 can be stored in the smart contract 606 as a transaction.

FIG. 7 shows further steps of the method 600, according to an example embodiment. At step 702, the system 200 provides access to the recipient 604 to download the NDA. The recipient downloads the NDA using the private key at step 704. At step 706, the system 200 stores the event of downloading the NDA in the smart contract 606. At step 708, the transaction of downloading the NDA by the recipient 604 is stored in the smart contract 606.

At step 710, the recipient 604 accepts the NDA and stores the acceptance of the NDA in the system 200 using the private key. The system 200 then can inform the owner 602 of the acceptance of the NDA by the recipient at step 712. At step 714, the owner 602 encrypts the digital asset using the private key of the owner 602 and uploads the digital asset to the system 200. At step 716, the system upload the digital asset to the blockchain 116. The blockchain 116 can generate the hash value for the digital asset and send the hash value to the system 200 at step 718. The system 200 can store the hash value associated with the digital asset in the smart contract 606 at step 722. At step 722, the smart contract 606 stores the digital asset as a transaction. At step 724, the system 200 informs the recipient 604 about the digital asset downloaded by the owner 602. At step 726, the recipient 604 downloads the digital asset using the private key of the recipient 604.

Figure 8:
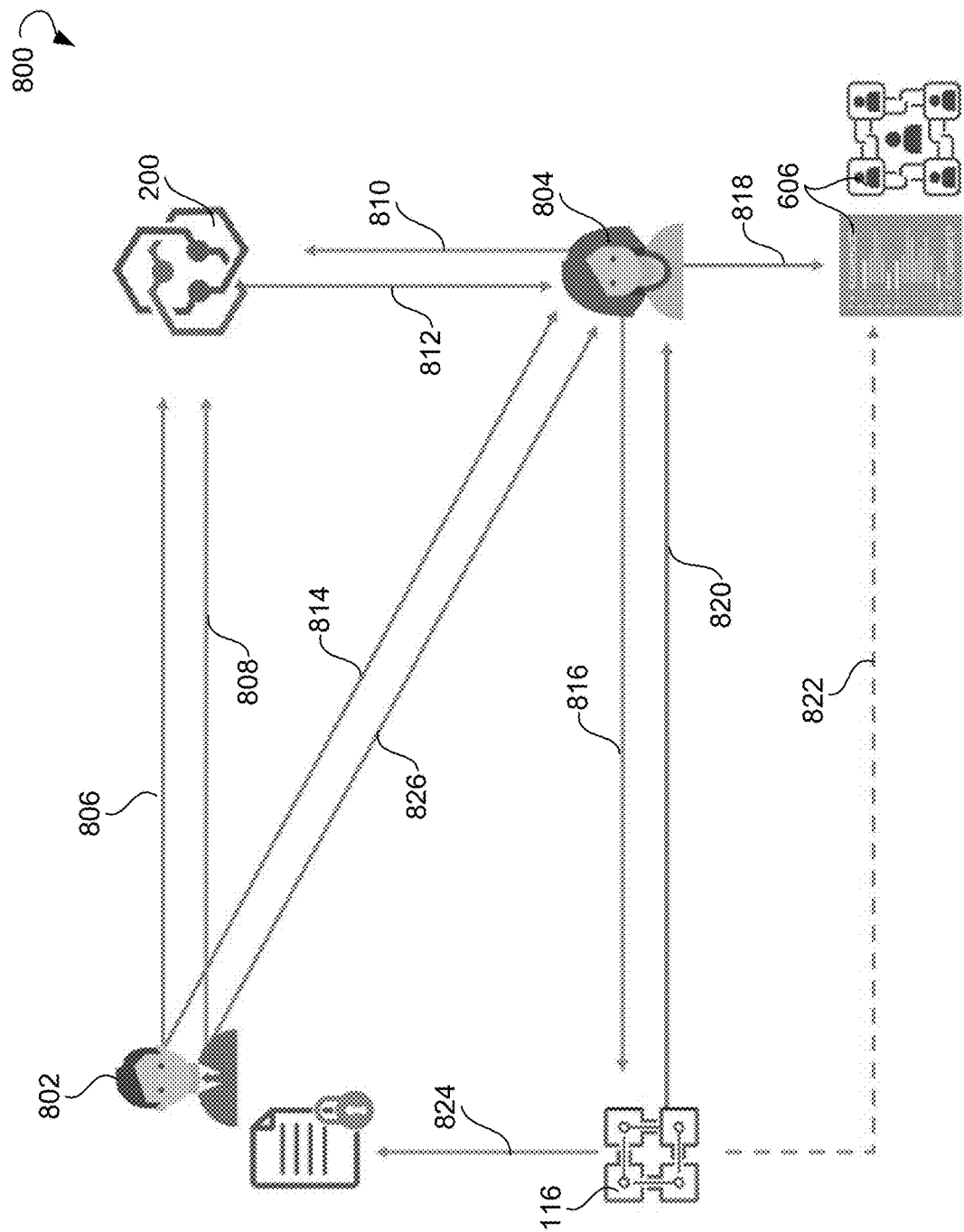
FIG. 8 is a schematic diagram illustrating a basic workflow between a first party and a second party, according to an example embodiment.

FIG. 8 is a schematic diagram 800 of a basic workflow between a first party shown as an attorney 802 and a second party shown as a client 804, according to an example embodiment. The attorney 802 may use the system 200 to exchange documents associated with specific clients using a graphical user interface (GUI) by both the attorney 802 and the client 804. In an example embodiment, the client 804 may include buyers and sellers of digital assets. In an example embodiment, the digital asset may include intellectual property. The blockchain 116 may be used to create users and associate each matter a blockchain address. The blockchain address can be used to set and verify permissions using smart contracts of the blockchain 116. Cryptography may be used to encrypt and decrypt the documents for secure transfer and decentralized blockchain can be used for storing the documents.

The combination of a smart contract with an escrow account to store a digital asset, such as the intellectual property embodied or incorporated in the digital asset, can facilitate licensing, selling, and transmitting the digital asset to a user (for example, a manufacturer or other participant in the supply chain) or a designee in a secure form together with the smart contract. Smart contracts involve transmission of valuable digital assets without an intermediary to ensure the protection of the transmitted digital asset.

The system 200 can improve conventional systems for activity tracking by creating a blockchain-based smart contract and storing related digital assets in escrow accounts and enabling the creator of the smart contract to incorporate, include, and transmit the stored digital assets with the smart contract. The system 200 may be used to solve the problem created when a valuable digital file is transmitted to a third party user without no control to ensure the secure transmission of the digital file and the authenticity and integrity of the digital file transmitted.

The main elements of the basic workflow between the parties include determining a person or entity willing to license or sell a digital asset to another person, creating a smart contract using the blockchain by the person or entity, placing the digital asset in a digital form into an escrow account which stores the digital asset, and digitally linking the escrow account to the smart contract via a software-based interface of the system 200. These elements are described in detail below.

In general, the system 200 deals with exchange of documents between the attorney and clients and uses the blockchain to set and verify permissions using smart contracts. Specifically, the client can access the document only if permissions are set by the attorney for the client to access a document. These permissions may be written in the smart contract of the blockchain. If permission is denied, the client cannot access the document.

Furthermore, when accessing any document either by the client or the attorney, respective private key of the client or the attorney is required. The private key entered by the attorney or the client is checked with the associated wallet address. Only if the private key and wallet address are associated, the attorney or the client can access the document. If the private key entered by the attorney or the client is wrong, then the document cannot be accessed by the attorney or the client.

Additionally, the seller will transfer the digital asset to the system 200 only if an NDA document is approved by the buyer during the escrow process. If the NDA document is not approved by the buyer, the digital asset will not be shared with the system 200.

The attorney 802 may add a new client, i.e. the client 804, using the system 200 at step 806. The attorney 802 may then associate the client 804 with a matter via the system 200 at step 808. The system 200 may send a message to the client 804 at step 810 to register the client 804 with the system 200. At step 812, the client 804 may register with the system 200. At step 814, the attorney 802 sends a request document list with permissions set in the smart contract 606 to the client 804. The client 804 can upload the document to the blockchain 116 at step 816. At step 818, the client 804 verifies permissions of the smart contract 606 and receives a hash value from the blockchain 116 at step 820. At step 822, the transaction is logged on the blockchain 116. The attorney 802 can download the document from the blockchain 116 at step 824. At step 826, the attorney 802 shares the hash value with the client 804.

Figure 9:
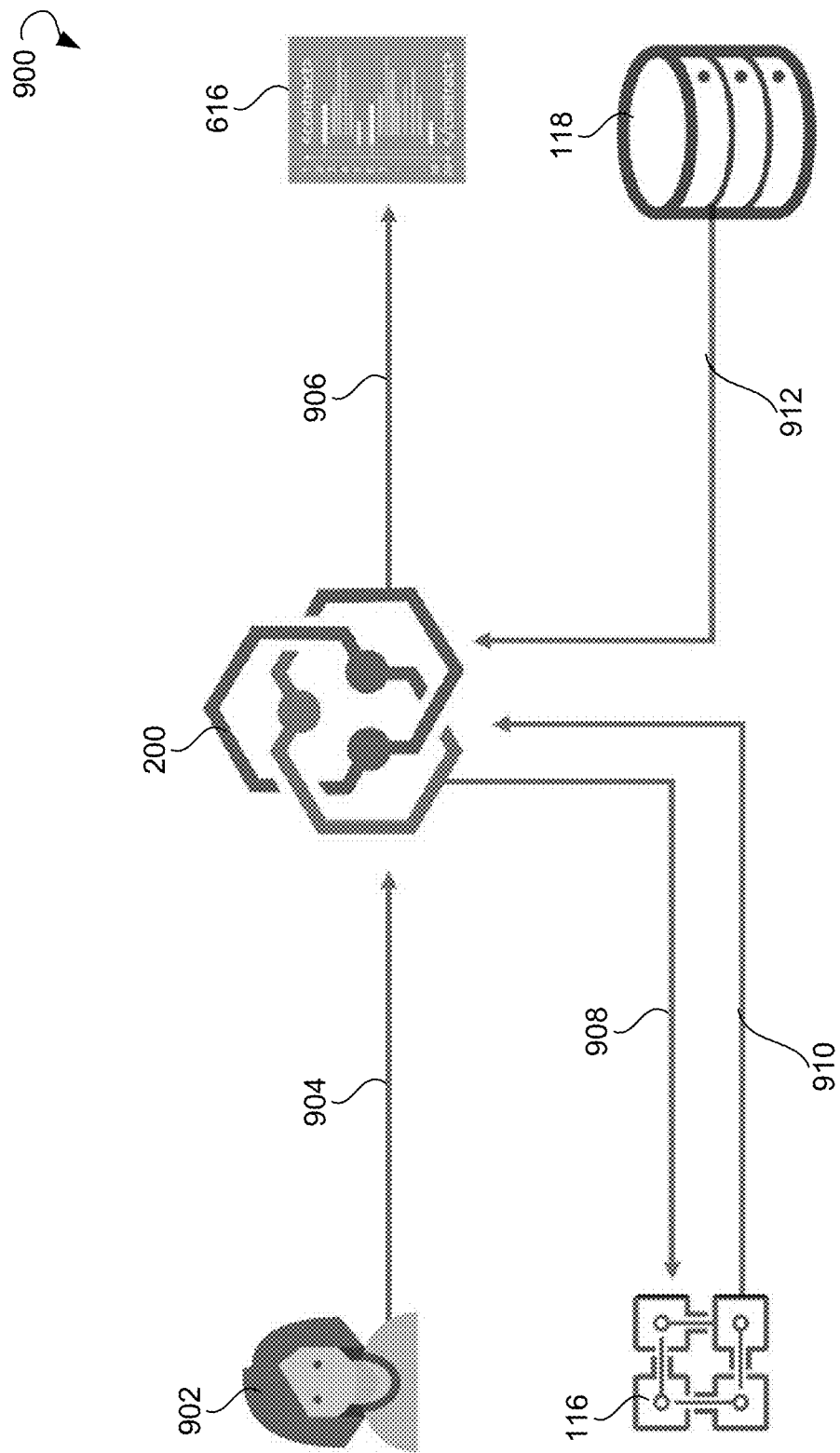
FIG. 9 is a schematic diagram illustrating verification of files by a system for analyzing and tracking work performance, according to an example embodiment.

FIG. 9 is a schematic diagram 900 illustrating verification of files by a system 200 for analyzing and tracking work performance, according to an example embodiment. The system 200 can verify whether a received/uploaded file is identical to a local copy of the file stored by the system 200 in the database 118. At step 904, the recipient 902 of a digital asset browses the file, e.g., a document, and provides a private key in order to verify the document by the system 200. At step 906, the system 200 can check permissions for the recipient 902 via the smart contract 616 and validate the private key. At step 908, the system 200 can upload the document to the blockchain 116. At step 910, the blockchain 116 can send the hash value associated with the document to the system 200. At step 912, the system 200 pulls the hash value from the database 119 and compares the pulled hash value with the new hash value generated for the document. If the hash values are identical, the system 200 can determine that the document has been already uploaded to the system 200. In particular, the system 200 can determine that the received/uploaded document is identical to a local copy of the document stored by the system 200.

Figure 10:
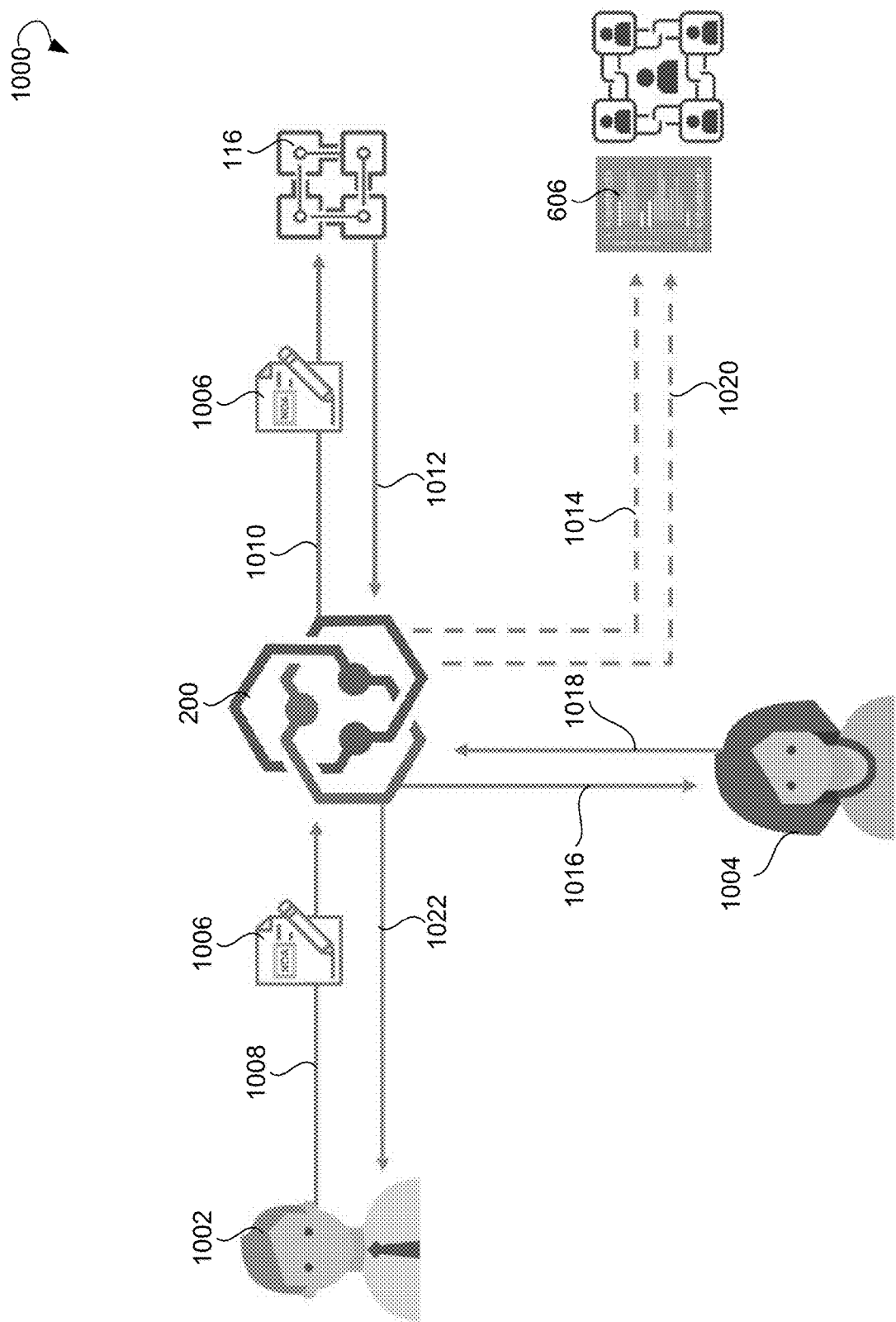
FIG. 10 is a schematic diagram illustrating exchange and execution of a non-disclosure agreement between parties by a system for analyzing and tracking work performance, according to an example embodiment.

FIG. 10 is a schematic diagram 1000 illustrating an exchange and execution of an NDA between parties by a system 200 for analyzing and tracking work performance, according to an example embodiment. At step 1008, an owner 1002 of a digital asset uploads the NDA 1006 to the system 200. At step 1010, the system 200 stores the NDA 1006 on the blockchain 116. At step 1012, the blockchain 116 sends a hash value associated with the NDA 1006 to the system 200. The system 200 records the hash value associated with the NDA 1006 to the smart contract 606 at step 1014. At step 1016, the recipient 1004 of the digital asset downloads the NDA 1006. The recipient 1004 signs the NDA and uploads the signed NDA to the system 200 at step 1018. At step 1020, the signing of the NDA 1006 by the recipient 1004 is recorded to the smart contract 606 on the blockchain 116. At step 1022, the system 200 can notify the owner 102 about signing the NDA 1006 by the recipient 1004.

In an example embodiment, the exchange and execution of the NDA between parties by the system 200 may have additional steps. The attorney may prepare the NDA and optionally provide an escrow name and description for reference. The attorney may further select the owner as a seller and select a recipient as a buyer. The attorney may also select an escrow agent. The escrow agent may be the attorney or a bank, such as an escrow bank 1102 described below with reference to FIG. 11. The attorney may enter a bank name as the escrow agent if the escrow agent is not the attorney. The attorney may confirm compensation and NDA acceptance and browse the NDA. The attorney may further provide his/her private key and upload the NDA. Upon uploading the NDA, the attorney may share the NDA with the recipient.

The recipient may select the escrow name in the system 200 and submit a request to buy the digital asset to the system 200. The system 200 may auto populate the name of the seller. The recipient may download the NDA to his/her local machine, read the NDA, sign the NDA, and accept the NDA. The recipient may select the escrow name in the system 200, submit a request to accept the NDA to the system 200, and upload the accepted NDA to the system 200.

Figure 11:
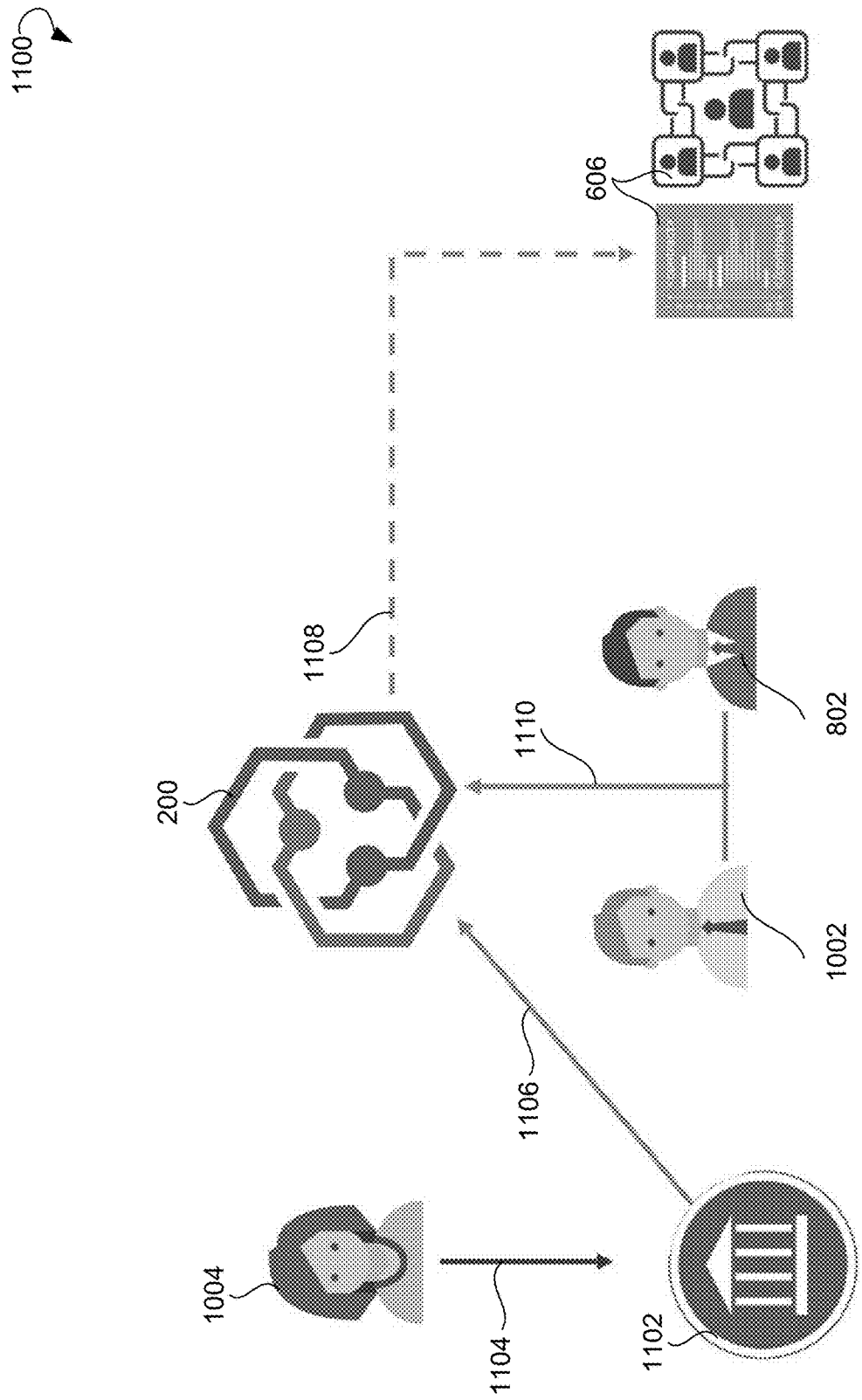
FIG. 11 is a schematic diagram illustrating deposition of consideration amount to an escrow bank using a system for analyzing and tracking work performance, according to an example embodiment.

FIG. 11 is a schematic diagram 1100 illustrating depositing of consideration amount in an escrow bank account using the system 200 for analyzing and tracking work performance, according to an example embodiment. At step 1004, a recipient 1004 of the digital asset can deposit a consideration amount for buying/licensing the digital asset with an escrow bank 1102. At step 1106, the escrow bank 1102 may confirm the details of the deposited consideration to the system 200. At step 1108, the system 200 records the event associated with the deposit of the consideration to the smart contract 606 on the blockchain. At step 1110, the owner 1002 of the digital asset and the attorney 802 may verify the details related to the consideration using the system 200. In an example embodiment, the attorney may enter his/her private key and confirm the receipt of consideration and acceptance of the NDA from the recipient.

Figure 12:
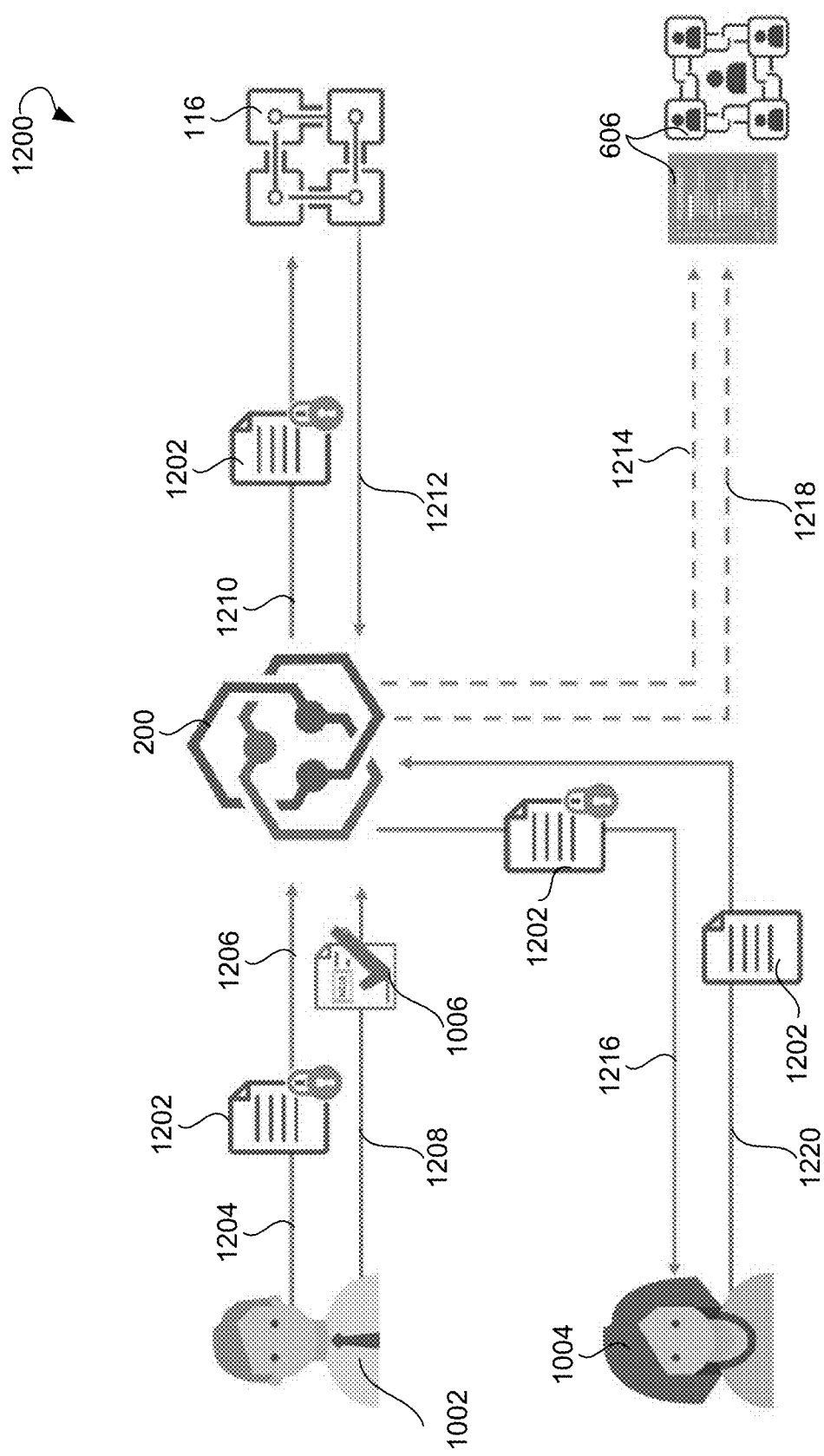
FIG. 12 is a schematic diagram illustrating sharing of a digital asset using a system for analyzing and tracking work performance, according to an example embodiment.

FIG. 12 is a schematic diagram 1200 illustrating sharing of a digital asset using the system 200 for analyzing and tracking work performance, according to an example embodiment. At step 1204, the owner 1002 of the digital asset 1202 (e.g., a document containing an intellectual property of the owner 1002) encrypts the digital asset 1202 using the public key. At step 1206, the owner 1002 can send the encrypted digital asset 1202 to the system 200. At step 1208, the owner 1002 can verify that the NDA 1006 has been accepted and the consideration amount has been paid by the recipient 1004. At step 1210, the system 200 stores the digital asset 1202 on the blockchain 116. At step 1212, the blockchain 116 sends a hash value associated with the digital asset to the system 200. The system 200 can record the hash value to the smart contract 606 at step 1214. At step 1216, the recipient 1004 can download the encrypted digital asset 1202. The system 200 can record the download of the digital asset 1202 by the recipient 1004 in the smart contract 606 at step 1218. At step 1220, the recipient 1004 can decrypt the digital asset 1202 using a private key of the recipient 1004.

In an example embodiment, details of sharing of the digital asset using the system 200 can also include the owner checking the status of fulfillment of conditions, in particular, whether the recipient has signed the NDA and deposited the consideration amount. The owner may choose to encrypt the digital asset manually or by using the system 200. The owner may also upload the encrypted digital asset to the system 200. The recipient may download the encrypted digital asset and the system 200 may record the transaction on the blockchain. The recipient may decrypt the digital asset using the private key of the recipient.

Figure 13:
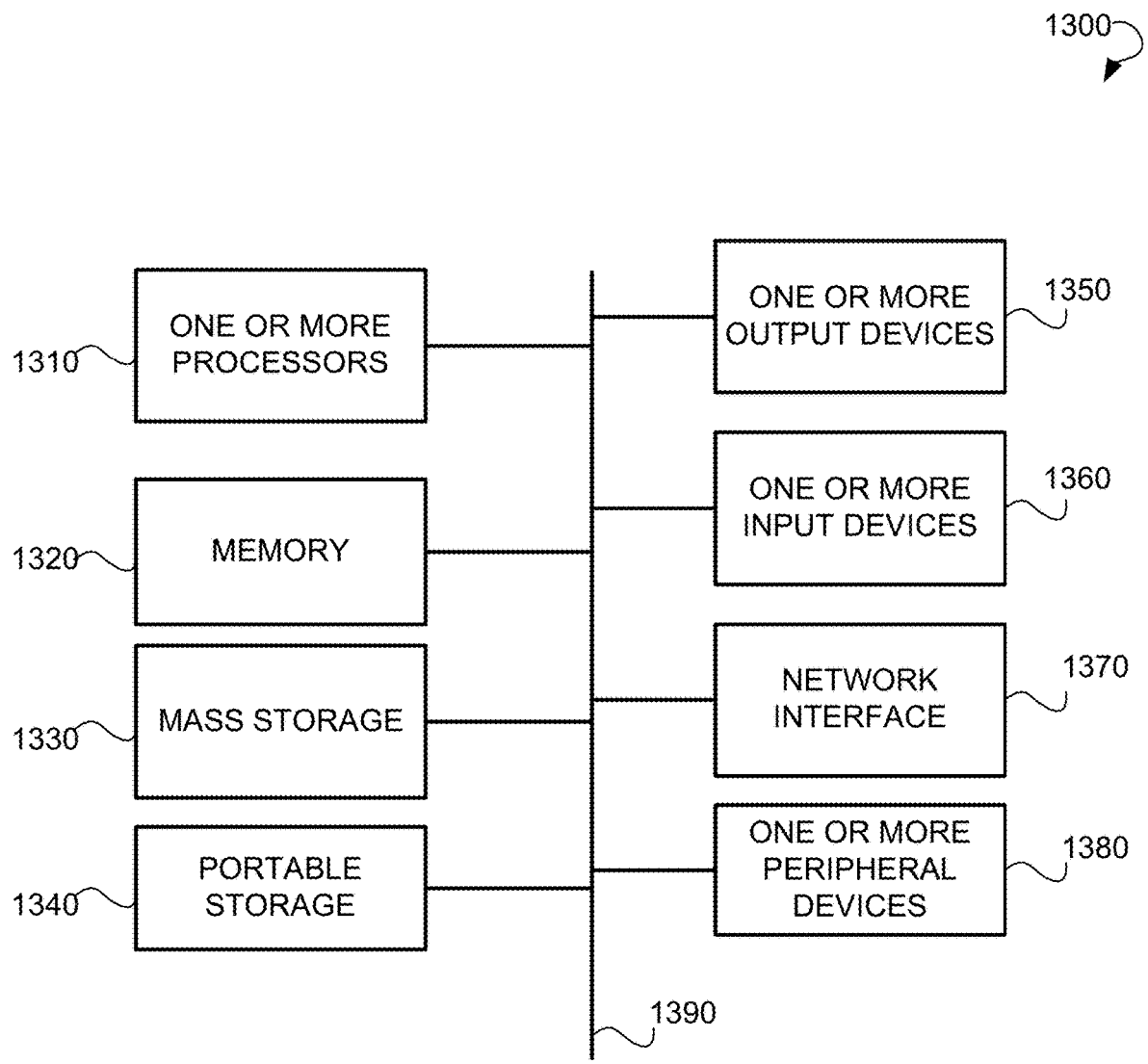
FIG. 13 shows a computing system that can be used to implement a method for analyzing and tracking work performance, according to an example embodiment.

FIG. 13 illustrates an exemplary computing system 1300 that may be used to implement embodiments described herein. The exemplary computing system 1300 of FIG. 13 may include one or more processors 1310 and memory 1320. Memory 1320 may store, in part, instructions and data for execution by the one or more processors 1310. Memory 1320 can store the executable code when the exemplary computing system 1300 is in operation. The exemplary computing system 1300 of FIG. 13 may further include a mass storage 1330, portable storage 1340, one or more output devices 1350, one or more input devices 1360, a network interface 1370, and one or more peripheral devices 1380.

The components shown in FIG. 13 are depicted as being connected via a single bus 1390. The components may be connected through one or more data transport means. The one or more processors 1310 and memory 1320 may be connected via a local microprocessor bus, and the mass storage 1330, one or more peripheral devices 1380, portable storage 1340, and network interface 1370 may be connected via one or more input/output buses.

Mass storage 1330, which may be implemented with a magnetic disk drive or an optical disk drive, is a non-volatile storage device for storing data and instructions for use by a magnetic disk or an optical disk drive, which in turn may be used by one or more processors 1310. Mass storage 1330 can store the system software for implementing embodiments described herein for purposes of loading that software into memory 1320.

Portable storage 1340 may operate in conjunction with a portable non-volatile storage medium, such as a compact disk (CD) or digital video disc (DVD), to input and output data and code to and from the computing system 1300 of FIG. 13. The system software for implementing embodiments described herein may be stored on such a portable medium and input to the computing system 1300 via the portable storage 1340.

One or more input devices 1360 provide a portion of a user interface. The one or more input devices 1360 may include an alphanumeric keypad, such as a keyboard, for inputting alphanumeric and other information, or a pointing device, such as a mouse, a trackball, a stylus, or cursor direction keys. Additionally, the computing system 1300 as shown in FIG. 13 includes one or more output devices 1350. Suitable one or more output devices 1350 include speakers, printers, network interfaces, and monitors.

Network interface 1370 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1370 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1380 may include any type of computer support device to add additional functionality to the computing system. The one or more peripheral devices 1380 may include a modem or a router.

The components contained in the exemplary computing system 1300 of FIG. 13 are those typically found in computing systems that may be suitable for use with embodiments described herein and are intended to represent a broad category of such computer components that are well known in the art. Thus, the exemplary computing system 1300 of FIG. 13 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, a blockchain-based systems and methods for analyzing and tracking work performance are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A blockchain-based system for analyzing and tracking work performance, the system comprising:
    an activity tracking module configured to:
        detect a plurality of actions performed by one or more users with regard to one or more digital files, wherein the detection includes:
            embedding a digital watermark into the one or more digital files, the digital watermark including a beacon tag, wherein the beacon tag includes a web beacon embedded into the digital watermark; and
            tracking the beacon tag to detect actions requested by the one or more users to be performed on the one or more digital files; and
        create a start time timestamp and an end time timestamp for each of the plurality of actions;
    a processor configured to:
        generate a hash value for each of the plurality of actions; and store the hash value and the start time timestamp and the end time timestamp associated with each of the plurality of actions to a record on a blockchain;

an analyzing module configured to:

analyze the hash value and the start time timestamp and the end time timestamp associated with each of the plurality of actions of the one or more users to evaluate the work performance of the one or more users, wherein the evaluating the work performance includes:

determining a total time worked for the one or more users based on the start time timestamp and the end time timestamp associated with each of the plurality of actions;

performing a total billing calculation for the one or more users based on the total time worked by the user when performing the plurality of actions;

based on the hash value, the start time timestamp, and the end time timestamp of each of the plurality of actions, determining that at least one of hash values, start time timestamps, and end time timestamps associated with one or more of the plurality of actions billed in the total billing calculation is indicative of at least one of the following actions performed by at least one user of the one or more users: frequent editing a document of the one or more digital files and frequent uploading and downloading of the document without making any edits of the document; and classifying the one or more of the plurality of actions as a fraudulent billing activity;

based on the one or more of the plurality of actions being associated with the fraudulent billing activity, reassign one or more tasks to the one or more users not associated with the fraudulent billing activity; and provide a report concerning the fraudulent billing activity; and the blockchain configured to store a plurality of records.

2. The system of claim 1, further comprising a machine learning module, the machine learning module being configured to:

collect historical data related to the work performance of each of the one or more users; and provide recommendations to at least one of the one or more users to improve the work performance of the each of the one or more users, the recommendations being provided based on machine learning and artificial intelligence (AI) trained on the historical data.

3. The system of claim 2, wherein the machine learning module is further configured to:

access external data provided by third parties; and analyze the external data and the historical data, wherein the recommendations for the at least one of the one or more users are selected based on the analysis.

4. The system of claim 2, wherein the machine learning module is further configured to detect a user with the work performance below the predetermined threshold based on the historical data associated with the one or more users.

5. The system of claim 1, wherein the activity tracking module is further configured to determine work time spent by the one or more users based on the start time timestamp and the end time timestamp for each of the plurality of actions performed by the one or more users.

6. The system of claim 1, wherein the processor is further configured to:

based on the analysis, classify one or more of the plurality of actions as a malicious activity; and based on the classification, selectively report the malicious activity to a network administrator.

7. The system of claim 1, wherein the plurality of actions include one or more of the following: opening of a digital file, closing a digital file, editing a digital file, printing a digital file, downloading a digital file, uploading a digital file, sending a digital file, receiving a digital file, converting a digital file, and copying a digital file.

8. The system of claim 1, wherein the processor is further configured to:

based on the analysis, classify one or more of the plurality of actions as a malicious activity; and report the malicious activity to a network administrator.

9. The system of claim 1, wherein the analyzing module is further configured to analyze hash values and timestamps associated with the one or more digital files to detect changes between an original version of the one or more digital files and an altered version of the one or more digital files.

10. The system of claim 1, wherein the analyzing module is further configured to determine work time spent by the one or more users based on the start time timestamp and the end time timestamp for each of the plurality of actions performed by the one or more users.

11. A blockchain-based method for analyzing and tracking work performance, the method comprising:

detecting, by an activity tracking module, a plurality of actions performed by one or more users with regard to one or more digital files, wherein the detecting includes:

embedding a digital watermark into the one or more digital files, the digital watermark including a beacon tag, wherein the beacon tag includes a web beacon embedded into the digital watermark; and tracking the beacon tag to detect actions requested by the one or more users to be performed on the one or more digital files;

creating, by the activity tracking module, a start time timestamp and an end time timestamp for each of the plurality of actions;

generating, by a processor, a hash value for each of the plurality of actions;

storing, by the processor, the hash value and the start time timestamp and the end time timestamp associated with each of the plurality of actions to a record on a blockchain;

analyzing, by an analyzing module, the hash value and the start time timestamp the end time timestamp associated with the plurality of actions of the one or more users to evaluate the work performance of the one or more users, wherein the evaluating the work performance includes:

determining a total time worked for the one or more users based on the start time timestamp and the end time timestamp associated with each of the plurality of actions;

performing a total billing calculation for the one or more users based on the total time worked by the user when performing the plurality of actions;

based on the hash value, the start time timestamp, and the end time timestamp of each of the plurality of actions, determining that at least one of hash values, start time timestamps, and end time timestamps associated with one or more of the plurality of actions billed in the total billing calculation is indicative of at least one of the following actions performed by at least one user of the one or more users: frequent editing a document of the one or more digital files and frequent uploading and downloading of the document without making any edits of the document and classifying the one or more of the plurality of actions as a fraudulent billing activity,;

based on the one or more of the plurality of actions being associated with the fraudulent billing activity, reassigning, by the analyzing module, one or more tasks to the one or more users not associated with the fraudulent billing activity; and providing, by the processor, a report concerning the fraudulent billing activity.

12. The method of claim 11, further comprising:
collecting, by a machine learning module, historical data related to the work performance of the one or more users; and
providing, by the machine learning module, recommendations to at least one of the one or more users to improve the work performance of the at least one of the one or more users, the recommendations being provided based on machine learning and artificial intelligence (AI) trained on the historical data.

13. The method of claim 11, further comprising:
performing optical character recognition (OCR) to extract text from a document;
determining that the document contains a signature;
generating a hash value associated with the signature; and
storing the hash value associated with the signature to the blockchain, the hash value associated with the signature being used for validating the signature contained in further documents.

14. The method of claim 11, further comprising setting permissions for each of the one or more users, the permissions including one or more actions permitted to be performed by the one or more users on the one or more digital files.

15. The method of claim 14, further comprising:
based on the permissions, determining that a user is not permitted to capture a screenshot of the one or more digital files; and
presenting the one or more digital files for view by the user in response to a prolonged press on a predetermined button by the user, wherein the prolonged press of the predetermined button deters capturing the screenshot of the one or more digital files.

16. The method of claim 11, further comprising:
printing a physical document using a quantum material, the quantum material being added to printing ink, the quantum material having predetermined electronic properties;
detecting a wavelength emitted by the quantum material of the physical document;
generating a hash value associated with the wavelength;
storing the hash value associated with the wavelength to the blockchain; and
detecting printing of further physical documents by:
    detecting a further wavelength emitted by the quantum material on the further physical documents; and
    matching the further wavelength and the hash value associated with the wavelength stored on the blockchain.

17. The method of claim 11, further comprising:
exchanging assets between parties, wherein the exchanging of the assets includes:
    receiving, by the processor, from a first user, a request to transfer at least one asset to a second user;
    in response to the request, creating, by the processor, a smart contract on the blockchain, the smart contract being associated with the first user and the second user;
    creating, by the processor, an escrow account associated with the smart contract, the escrow account being stored on the blockchain;
    receiving, by the processor, from the first user, the at least one asset to be stored on the escrow account;
    transmitting, by the processor, the smart contract and the at least one asset to the second user; and
    recording the transmission of the smart contract and the at least one asset to the second user as a transaction on the blockchain.

18. The method of claim 17, further comprising:
creating a private key for the first user;
providing the private key and a public key to the first user, wherein the first user encrypts the at least one asset using the public key to upload the at least one asset to the escrow account;
creating a private key for the second user;
providing the private key and the public key to the second user, wherein the second user decrypts the at least one asset using the private key to download the at least one asset from the escrow account; and
receiving a consideration or providing a compensation to the first user or the second user.

19. A blockchain-based system for analyzing and tracking work performance, the system comprising:
an activity tracking module configured to:
    detect a plurality of actions performed by one or more users with regard to one or more digital files, wherein the detection includes:
        embedding a digital watermark into the one or more digital files, the digital watermark including a beacon tag, wherein the beacon tag includes a web beacon embedded into the digital watermark; and
        tracking the beacon tag to detect actions requested by the one or more users to be performed on the one or more digital files; and
    create a start time timestamp and an end time timestamp for each of the plurality of actions;
a processor configured to:
    generate a hash value for each of the plurality of actions; and
    store the hash value and the start time timestamp and the end time timestamp associated with each of the plurality of actions to a record on a blockchain;
an analyzing module configured to:
    analyze the hash value and the start time timestamp the end time timestamp associated with each of the plurality of actions of the one or more users to evaluate the work performance of the one or more users, wherein the evaluating the work performance includes:
        determining a total time worked for the one or more users based on the start time timestamp and the end time timestamp associated with each of the plurality of actions;
        performing a total billing calculation for the one or more users based on the total time worked by the user when performing the plurality of actions;

based on the hash value, the start time timestamp, and the end time timestamp of each of the plurality of actions, determining that at least one of hash values, start time timestamps, and end time timestamps associated with one or more of the plurality of actions billed in the total billing calculation is indicative of at least one of the following actions performed by at least one user of the one or more users: frequent editing a document of the one or more digital files and frequent uploading and downloading of the document without making any edits of the document; and classifying the one or more of the plurality of actions as a fraudulent billing activity;

based on the one or more of the plurality of actions being associated with the fraudulent billing activity, reassign one or more tasks to the one or more users not associated with the fraudulent billing activity; and provide a report concerning the fraudulent billing activity; and machine learning module being configured to:

collect historical data related to the work performance of each of the one or more users;

provide recommendations to at least one of the one or more users to improve the work performance of the each of the one or more users, the recommendations being provided based on machine learning and artificial intelligence (AI) trained on the historical data; and based on the historical data associated with the one or more users, detecting, by the machine learning module, a user with the work performance below the predetermined threshold.

\* \* \* \* \*